United States Patent Office 3,810,948
Patented May 14, 1974

3,810,948
CATALYTIC PRODUCTION OF 1,1-DIFLUOROETHANE
Johann Nikolaus Meussdoerffer, Blecher, and Hans Niederprum, Monheim, Rhineland, Germany, assignors to Bayer Aktiengesellschaft, Leverkusen, Germany
No Drawing. Filed July 20, 1972, Ser. No. 273,654
Claims priority, application Germany, Aug. 10, 1971,
P 21 39 993.9
Int. Cl. C07c 17/08, 19/08
U.S. Cl. 260—653.6          10 Claims

ABSTRACT OF THE DISCLOSURE

In the production of 1,1-difluoroethane wherein acetylene is reacted in liquid or gas phase with hydrogen fluoride, the improvement which comprises effecting the reaction in the presence of a sulfonic acid of the formula $XSO_3H$
in which X is a fluorine atom or a perfluorinated alkyl radical of up to about 12 carbon atoms, and
a complex fluoride of the formula $A_nZF_m$
in which A is a metal or an optionally substituted ammonium radical, Z is an element of the group III to VIII of the periodic system of elements, n is 1, 2 or 3 and m is 4 or 6.

Preferably $A_nZF_m$ is an alkali metal or alkaline earth metal tetrafluoroborate and is present in about 0.01 to 5% of the weight of the sulfonic acid employed.

---

This invention relates to a process for the production of 1,1-difluoroethane wherein acetylene is reacted with hydrogen fluoride in the presence of a fluorine-containing sulfonic acid and a small quantity of a complex fluoride.

It is known that 1,1-difluoroethane can be produced in different ways, either from 1,1-dichloroethane and hydrogen fluoride, from vinyl fluoride and hydrogen fluoride or even from acetaldehyde and sulfur tetrafluoride. Unfortunately, none of these processes has acquired any commercial significance on account of the disadvantages by which they are attended.

It is also known that acetylene can be reacted with hydrogen fluoride to form vinyl fluoride, 1,1-difluoroethane or even a mixture of these compounds. However, this chemical addition of hydrogen fluoride to acetylene only takes place satisfactorily to some extent in the presence of a catalyst. In most cases, however, vinyl fluoride is simultaneously formed in addition to the required 1,1-difluoroethane:

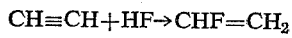

$$CH{\equiv}CH + HF \rightarrow CHF{=}CH_2$$

$$CH{\equiv}CH + 2HF \rightarrow CHF_2{-}CH_3$$

Reaction mixtures of this kind involve the use of elaborate working-up apparatus in order to separate the vinyl fluoride formed from the 1,1-difluoroethane.

Catalysts which hitherto have been proposed for the fluorination of acetylene include in particular boron trifluoride, fluorosulfonic acid, tin tetrachloride, titanium tetrachloride and antimony pentachloride for the liquid-phase reaction and also tin tetrachloride or titanium tetrachloride on active carbon for the gaseous-phase reaction [cf. for example Houben-Weyl, Methoden der organ. Chemie, V/3, pp. 110–111 (1962)]. In addition, mixtures of fluorosulfonic acid and $SnCl_4$, $TiCl_4$, $SbCl_5$ and $SbF_5$ are described as effective catalysts for the fluorination of acetylene in German Offenlegungsschrift No. 1,945,655 and in German Auslegeschrift No. 1,245,348. In this case too, however, the reaction of acetylene with hydrogen fluoride in the presence of the catalysts mentioned above generally results in the formation of mixtures with varying proportions of vinyl fluoride and 1,1-difluoroethane, depending upon the particular reaction conditions prevailing.

Furthermore, serious resinification occurs in the reaction of acetylene with hydrogen fluoride in fluorosulfonic acid as the reaction medium, resulting in reductions in yield, apart from premature consumption of the fluorosulfonic acid used [cf. for example Houben-Weyl, 1.c. p. 110].

Although yields of up to substantially 95% can be obtained by the reaction of acetylene with hydrogen fluoride in the presence of boron trifluoride and fluorosulfonic acid, the reaction is not completely satisfactory. The reason for this is that it is not sufficient to introduce catalytic quantities of $BF_3$ in a single, collective addition, instead considerable quantities have to be introduced before the reaction actually begins, and subsequently quantities of up to substantially 10% by weight of $BF_3$, based on the acetylene used, have to be introduced continuously during the reaction [Houben-Weyl, 1.c. p. 111]. The addition of these large quantities of $BF_3$ inevitably gives rise to additional separation problems on account of the high volatility of $BF_3$, quite apart from the high cost of the boron trifluoride which is extremely sensitive to hydrolysis. This boron trifluoride cannot be recycled without considerable technical outlay.

Tests have shown that the problem posed by the relatively high degree of volatility and extreme sensitivity to hydrolysis, cannot be solved by using $SnCl_4$, $TiCl_4$ or $SbCl_5$. If these catalysts are applied to inert supports, the catalyst is deactivated after only a relatively short test period, more particularly through sticking of the active surfaces caused by hydrolysis.

The reaction product of a molar mixture of fluorosulfonic acid and antimony (V) fluoride, described in German Offenlegungsschrift No. 1,945,655, represents another catalyst system. However, the complex acid formed, namely $HSO_3SbF_6$, the so-called "magic acid," has to be used in pure form in very considerable quantities to enable the reaction of acetylene with hydrogen fluoride to be maintained for a prolonged period. Accordingly, the catalyst in question is only a liquid catalyst and not a catalyst solution. For this reason, it cannot be regarded as a genuine catalyst system. Furthermore, this reaction medium is highly corrosive, dissolving even nickel.

It is accordingly an object of the invention to provide a process for producing 1,1-difluoroethane which is highly efficient, simple and capable of being performed in inexpensive equipment.

These and other objections and advantages are realized in accordance with the present invention pursuant to which pure 1,1-difluoroethane is produced by reacting hydrogen fluoride with acetylene in the liquid or gaseous phase, the reaction being carried out in the presence of a sulfonic acid of the formula $XSO_3H$, in which X is a fluorine atom or a perfluorinated alkyl radical having 1 to 12 carbon atoms, e.g. a linear or branched or cyclic radical preferably having up to about 8 carbon atoms, and in the presence of a compound corresponding to the formula $A_nZF_m$ in which A is a metal or an optionally substituted ammonium radical,
Z is an element of the Group III to VIII of the Periodic System of Elements,
n is 1, 2 or 3 and
m is 4 or 6.

Surprisingly, it has been found that only very small quantities of complex fluorides are required in the process according to the invention. These substances which are dispersed or dissolved in the sulfonic acid are added in a quantity of about 0.01 to 5% by weight, based on the sulfonic acid used. In general, a quantity of for example about 1% of the complex fluoride in the sulfonic acid is entirely adequate. Accordingly, there exists here a genuine catalytic effect, especially since there were no signs of deactivation, even after prolonged test runs. Since, in addition the complex fluorides are not sensitive to moisture, the catalyst cannot be deactivated by the water entrained with the hydrogen fluoride.

Fluorosulfonic acid and also any perfluoroalkyl sulfonic acid in which X represents a perfluorinated, linear or branched or cyclic alkyl radical having from 1 to 12 carbon atoms, can be used as the sulfonic acid corresponding to the formula $XSO_3H$. Trifluoromethane sulfonic acid, perfluorobutane sulfonic acid and perfluorooctane sulfonic acid, for example, are eminently suitable as well as the already mentioned fluorosulfonic acid.

The use of perfluoroalkyl sulfonic acids has the advantage that these compounds are completely stable and, for this reason, can also readily be regenerated.

According to the invention, the catalysts can be used both in the liquid phase and in the gaseous phase. Where they are used in the gaseous phase, the catalyst mixture can be applied in known manner to inert supporting materials such as, for example, active carbon.

Suitable complex fluorides of the general formula $A_nZF_m$ are for instance $K_2TiF_6$, $K_2ZrF_6$, $KPF_6$, $KAsF_6$, $Na_3AlF_6$, $Na_2SiF_6$, $K_2SnF_6$, $K_2SiF_6$, $NaSbF_6$; preferred complex fluorides are the tetrafluoroborates such as $KBF_4$ or $NaBF_4$. As it can be recognized from this list, as A of the general formula $A_nZF_m$ alkali metals are preferred. But it is also within the scope of the present invention to use fluoride complexes with other metal ions or ammonium radicals as cation.

The process is preferably carried out by introducing acetylene and gaseous hydrogen fluoride either separately or in admixture into or through the fluorine-containing sulfonic acid activated with the complex fluoride. The reaction mixture can be stirred during the introduction.

The molar ratio of hydrogen fluoride to acetylene ranges from about 2:1 to 6:1 and preferably from about 2:1 to 3:1.

The reaction temperature is generally below the boiling temperature of the particular fluorine-containing sulfonic acid used, the reaction preferably being carried out at a temperature in the range of from about $-20$ to $+100°$ C. The reaction can be carried out under pressures of up to about 10 atmospheres, although it is preferably carried out at atmospheric pressure.

The process according to the invention can be carried out either continuously or batch-wise. By virtue of the particular advantages of the catalyst system, the process is particularly suitable for continuous working.

The 1,1-difluoroethane is useful as an intermediate in the synthesis of the polymerizable fluoro-olefins, vinyl fluoride and vinylidene fluoride. The homopolymers and copolymers produced therefrom are useful for corrosion-resistant coatings and for weather-resistant paints. 1,1-difluoroethane is also used as a coolant.

The process according to the invention is illustrated by the following examples:

EXAMPLE 1

A two liter nickel vessel equiped with a stirring mechanism and provided with a corrosion-resistant surface coating of polyvinylidene fluoride, was used as the reactor. A solution of 1 liter (17.4 moles) of fluorosulfonic acid and 1 g. (0.00794 mole) of potassium tetrafluoroborate was present as catalyst in the reaction vessel. 30.0 liters (1.34 mole) per hour of acetylene and 61.5 liters (2.75 moles) per hour of gaseous hydrogen fluoride were introduced with stirring. Hydrofluorination of the acetylene was carried out under normal pressure at a temperature of 55° C. The gases issuing from the reactor were freed from unreacted hydrogen fluoride by scrubbing with water and alkali liquor, followed by condensation. After a test period of 20 hours, the yield of 1,1-difluoroethane was still in excess of 99.7%.

EXAMPLE 2

30.0 liters (1.34 moles) per hour of acetylene and 67.0 liters (3.0 moles) per hour of gaseous hydrogen fluoride at 70° C. were introduced with stirring into a catalyst solution consisting of 1 liter (6.1 moles) of perfluorobutyl sulfonic acid and 31.5 g. (0.25 mole) of potassium tetrafluoroborate, accommodated in the nickel reactor coated with polyvinylidene fluoride. In addition to the hydrogen fluoride which had been supplied in a slight excess, the gases issuing from the reactor contained only 1,1-difluoroethane.

EXAMPLE 3

In another test, 30.0 liters (1.34 moles) per hour of acetylene and 61.5 liters (2.75 moles) per hour of hydrogen fluoride were introduced with stirring at 60° C. into a catalyst solution consisting of 1 liter (17.4 moles) of fluorosulfonic acid and 63.0 g. (0.5 mole) of potassium tetrafluoroborate.

Even after repeated interruption of the test, there were no signs that the catalyst had undergone deactivation, even after a test period of 20 hours. Examination of the reaction gases showed that, even with this relatively high content of potassium tetrafluoroborate, neither boron trifluoride nor any other boron compound was to be found in the waste gases. This is attributable to the fact that this catalyst system is completely stable and no volatile boron compounds are formed.

EXAMPLE 4

A two liter nickel vessel equipped with a stirring mechanism was used as the reactor. A solution of 1 liter of fluorosulfonic acid and 6 g. of $K_2ZrF_6$ was present as catalyst in the reaction vessel. 30.0 liters per hour of acetylene and 61.5 liters per hour of gaseous hydrogen fluoride were introduced with stirring under normal pressure and at a temperature of 55° C. After a test period of 20 hours the yield of 1,1-difluoroethane was still in excess of 99.6%.

EXAMPLE 5

This example was carried out under the same conditions as described for Example 4. As catalyst 4.5 g. $KAsF_6$ was used and 67.0 liters per hour HF were introduced. The reaction product was 99.65% 1,1-difluoroethane.

EXAMPLE 6

In this test 30 liters per hour acetylene and 65 liters per hour of HF were reacted in a reaction vessel with 1 liter fluorsulfonic acid and 24 g. $K_2TiF_6$. The gases issuing from the reactor were freed from unreacted hydrogen fluoride by scrubbing with water and alkali liquor, followed by condensation. After a test period of 20 hours, the yield of 1,1-difluoroethane was 96.9%.

It will be appreciated that the instant specification and examples are set forth by way of illustration and not limitation, and that various modifications and changes may be made without departing from the spirit and scope of the present invention.

What is claimed is:

1. In the production of 1,1-difluorethane wherein acetylene is reacted in liquid or gas phase with hydrogen fluoride, the improvement which comprises effecting the reaction in the presence of a sulfonic acid of the formula $XSO_3H$ in which X is a fluorine atom or a perfluorinated alkyl radical of up to about 12 carbon atoms, and a complex fluoride of the formula $A_nZF_m$ in which A is an alkali metal or alkaline earth metal or an ammonium radical, Z is an element selected from the group consisting of Al, Zr, P, As, Si, Ti, Sn and Sb, $n$ is 1, 2 or 3 and $m$ is 4 or 6, at a temperature of about −20 to 100° C.

2. The process of claim 1, wherein $A_nZF_m$ is a member selected from the group consisting of $Na_3AlF_6$, $K_2ZrF_6$, $KPF_6$, $KAsF_6$, $Na_2SiF_6$ or $K_2TiF_6$.

3. The process of claim 1, wherein $A_nZF_m$ comprises at least one alkali or alkaline earth metal tetrafluoroborate.

4. The process of claim 1, wherein $A_nZF_m$ is $KBF_4$.

5. The process of claim 1, wherein the reaction is carried out below the boiling point of the sulfonic acid employed.

6. The process of claim 1, wherein the reaction is carried out at a temperature of about −20 to 100° C.

7. The process of claim 1, wherein the molar ratio of acetylene to hydrogen fluoride ranges from about 1:2 to 1:6.

8. The process of claim 1, wherein the compound $A_nZF_m$ is present in about 0.01 to 5% of the weight of the sulfonic acid employed.

9. The process of claim 8, wherein $A_nZF_m$ comprises at least one alkali or alkaline earth metal tetrafluoroborate, and the molar ratio of acetylene to hydrogen fluoride ranges from about 1:2 to 1:6.

10. The process of claim 8, wherein $A_nZF_m$ is $KBF_4$ and the molar ratio of acetylene to hydrogen fluoride ranges from about 1:2 to 1:6.

References Cited
UNITED STATES PATENTS

| 2,634,300 | 4/1953 | Hillyer et al. | 260—653.6 |
| 3,317,619 | 5/1967 | Hedge et al. | 260—653.6 |
| 3,413,362 | 11/1968 | Otaku et al. | 260—653.6 |

DANIEL D. HORWITZ, Primary Examiner

U.S. Cl. X.R.

252—429, 439